US006971089B2

(12) United States Patent  (10) Patent No.: US 6,971,089 B2
Bates et al.  (45) Date of Patent: Nov. 29, 2005

(54) DEBUGGER IMPACT REDUCTION THROUGH MOTION OF INDUCTION VARIABLE BASED BREAKPOINTS

(75) Inventors: Cary Lee Bates, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 09/918,573

(22) Filed: Aug. 1, 2001

(65) Prior Publication Data

US 2003/0028862 A1    Feb. 6, 2003

(51) Int. Cl.[7] .............................................. G06F 9/44
(52) U.S. Cl. ...................... 717/131; 717/124; 717/127; 717/129; 717/132; 717/133
(58) Field of Search ........................ 717/129, 124–133

(56) References Cited

U.S. PATENT DOCUMENTS

| | | | |
|---|---|---|---|
| 5,471,593 | A | 11/1995 | Branigin |
| 5,687,375 | A | 11/1997 | Schwiegelshohn |
| 5,966,539 | A | 10/1999 | Srivastava |
| 5,999,737 | A | 12/1999 | Srivastava |
| 6,077,312 | A | 6/2000 | Bates et al. |
| 6,226,787 | B1 | 5/2001 | Serra et al. |
| 6,240,549 | B1 | 5/2001 | Hamada et al. |
| 6,263,489 | B1 | 7/2001 | Olsen et al. |
| 6,480,818 | B1 | 11/2002 | Alverson et al. |
| 6,571,385 | B1 | 5/2003 | Muthukumar et al. |
| 6,658,471 | B1 | 12/2003 | Berry et al. |
| 6,708,326 | B1 | 3/2004 | Bhattacarya |

OTHER PUBLICATIONS

Wahbe et al., Practical Data Breakpoints: Design and Implementationh 1993, ACM, p. 1-12.*

Hanson et al., A Machine-Independent Debugger, Dept. of Computer Science, Princeton University, Software—Practice And Experience, vol., 26(11), pp. 1277-1299, Nov. 1996.*

Compilers, Principles, Techniques, and Tools, by A. V. Aho, R. Sethi, and J.D. Ullman, Addison-Wesley, 1986, Section 10.7.

U.S. Appl. No. 09/897,608, entitled "Debugger Impact Reduction through Breakpoint Motion," filed on Jul. 3, 2001 by Cary L. Bates et al.

Wu et al., "A New Framework for Debugging Globally Optimized Code," 1999, ACM, pp. 181-191.

R. Wismuller, "Debugging of Globally Optimized Programs Using Data Flow Analysis," 1994, ACM, pp. 278-289.

Grant et al., "The Benefits and Costs of DyC's Run-Time Optimizations," 2000, ACM, pp. 932-972.

* cited by examiner

Primary Examiner—Kakali Chaki
(74) Attorney, Agent, or Firm—Rabin & Berdo, P.C.

(57) ABSTRACT

Debugger impact reduction through motion of an induction variable based breakpoint ("IV-breakpoint") set within a program loop, where the IV-breakpoint and the loop are controlled by an induction variable having an induction rate, may include extracting, from program code within the program loop, the induction rate; extracting, from the IV-breakpoint, a final value of the induction variable for which the IV-breakpoint would be satisfied; and if the IV-breakpoint is satisfied and the induction variable has a present value that would be beyond the final value upon a next iteration of the loop based on the induction rate, removing the IV-breakpoint. Debugger impact reduction may further include setting, at one or more loop exit program positions, a reset breakpoint; and if one of the reset breakpoints is satisfied, removing the reset breakpoints and/or reestablishing the IV-breakpoint.

10 Claims, 3 Drawing Sheets

```
Line 1    foo_1(K)
     2    {
     3        Y=2;
     4        for (J=0;J<10000;J++)
     5        {
     6            A[J]=K+J;
     7        }
     8        return(K+Y);
     9    }
```

20 — IV-Breakpoint          =BREAK 6 WHEN J<500
22 — Induction Variable     =J
24 — Induction Rate         =J=J+1;
26 — Final Value            =499
28 — Reset Breakpoint       =BREAK 8 RESET

FIG. 3

```
Line 1    foo_1(FLAG, K)
     2    {
     3        J=0;
     4        while (J<10000)
     5        {
     6            A[J]=K+J;
     7            if(FLAG==TRUE)
     8                J++;
     9            else
    10                J+=2;
    11            if(checkforERROR()==TRUE)
    12                return (K);
    13        }
    14        return(K);
    15    }
```

20 — IV-Breakpoint          =BREAK 6 WHEN J<500 OR J==600
22 — Induction Variable     =J
24 — Induction Rate         =J=J+1,J=J+2
26 — Final Value            =600
28 — Reset Breakpoint       =BREAK 12 RESET
     Reset Breakpoint       =BREAK 14 RESET

FIG. 4

DEBUGGER IMPACT REDUCTION THROUGH MOTION OF INDUCTION VARIABLE BASED BREAKPOINTS

CROSS REFERENCE TO RELATED APPLICATIONS

The following is a related co-pending U.S. patent application:
DEBUGGER IMPACT REDUCTION THROUGH BREAKPOINT MOTION, Ser. No. 09/897,608, filed Jul. 3, 2001, by Cary Lee Bates and William Jon Schmidt.

BACKGROUND OF THE INVENTION

1. Field of the Invention

The invention relates to debugger impact reduction through motion of induction variable based breakpoints.

2. Background Information

A debugger is a software tool used by programmers in software development to identify and correct program errors within a program. To support the debugger, information describing symbols and types in the program as well as information to map between source lines and the binary code may be provided by a compiler and/or an interpreter ("compiler"). This extra information, generally referred to as debugging information, enables the programmer to examine the types, variables and data structures by name and to follow the execution of the program through the source code.

With a debugger, programmers may "step" through program code statements one at a time, while the corresponding machine instructions are being executed. As programmers step through code, they may, inter alia, concurrently monitor changes in certain variables, which assists in identifying and correcting program errors.

With a debugger, a programmer may also set a breakpoint at a specific program position. When the program is executed, the debugger will stop execution of the program at any breakpoint encountered, and may display various programming elements, such as software variables for example, to assist in the debugging process.

Debuggers may also allow programmers to define and set conditional breakpoints. A conditional breakpoint is a breakpoint that has an associated Boolean expression. Upon encountering a conditional breakpoint, a debugger will only stop execution of the program if the associated Boolean expression is evaluated by the debugger to be TRUE (i.e., satisfied). For example, a conditional breakpoint may be BREAK 6 WHEN K<999. Accordingly, a debugger would only stop execution of the program at the location of such a conditional breakpoint (here, line 6) if the variable K is less than the value 999 when the conditional breakpoint is encountered.

In today's software development environment, many new software applications are threaded. As such, they are designed to efficiently execute in multitasking or multiprocessing environments, which allow multiple threads, or streams of execution, to execute concurrently. With the increased frequency of threaded applications, programming timing errors are becoming more common than ever.

A significant problem with debugging program timing errors is that the introduction of breakpoints may dramatically affect program timing, which may make difficult or impossible the reproduction of program errors in the debugging environment. While conditional breakpoints may affect overall program timing less than normal breakpoints and program code stepping, they still require a short amount of time for their associated Boolean expressions to be evaluated. Although this short amount of time may be tolerable in some cases, where the conditional breakpoint is encountered a large number of times, program timing may be so significantly affected that reproducing program errors in a debugging environment may be difficult or impossible.

A frequently occurring situation in which a conditional breakpoint may be encountered a large number of times is where the breakpoint is set within a program loop. A program loop is a repetition within a program, and may iterate a large number of times. Therefore, where a conditional breakpoint is set within a program loop, program timing is more likely to be substantially affected, and accordingly, the difficulty or impossibility of reproducing program errors in the debugging environment becomes more likely. Further, a conditional breakpoint set within a program loop may be based on the induction variable that also controls the program loop (i.e., an induction variable based breakpoint).

Therefore, it would desirable to provide debugger impact reduction through motion of induction variable based breakpoints.

SUMMARY OF THE INVENTION

It is, therefore, a principle object of this invention to provide debugger impact reduction through motion of induction variable based breakpoints ("IV-breakpoints").

It is another object of the invention to provide debugger impact reduction through motion of IV-breakpoints that assists in minimizing the above mentioned problems.

These and other objects of the present invention are accomplished by debugger impact reduction through motion of IV-breakpoints as disclosed herein.

In an exemplary aspect of the invention, a method of reducing debugger impact through motion of an IV-breakpoint set within a program loop, where the IV-breakpoint and the loop are controlled by an induction variable having an induction rate, may comprise: extracting, from program code within the program loop, the induction rate; extracting, from the IV-breakpoint, a final value of the induction variable for which the IV-breakpoint would be satisfied; and if the IV-breakpoint is satisfied and the induction variable has a present value that would be beyond the final value upon a next iteration of the loop based on the induction rate, removing the IV-breakpoint.

In a further exemplary aspect of the invention, a method of reducing debugger impact through motion of an IV-breakpoint may further comprise: setting, at one or more loop exit program positions, a reset breakpoint; and if one of the reset breakpoints is satisfied, removing the reset breakpoints and/or reestablishing the IV-breakpoint.

Each of the above aspects may be embodied in a method, a debugger, and an article of manufacture comprising a computer readable program storage medium tangibly embodying one or more programs of instructions executable by a computer.

BRIEF DESCRIPTION OF THE DRAWINGS

FIG. 3 illustrates an exemplary set of program code used to describe the embodiments of FIGS. 1-2 in operation.

FIG. 4 illustrates another exemplary set of program code used to describe the embodiments of FIGS. 1-2 in operation.

DETAILED DESCRIPTION OF THE PREFERRED EMBODIMENTS

The invention will now be described in more detail by way of example with reference to the illustrative embodiments shown in the accompanying figures. It should be kept in mind that the following described embodiments are only presented by way of example and should not be construed as limiting the inventive concept to any particular configuration or order.

Figure 1:
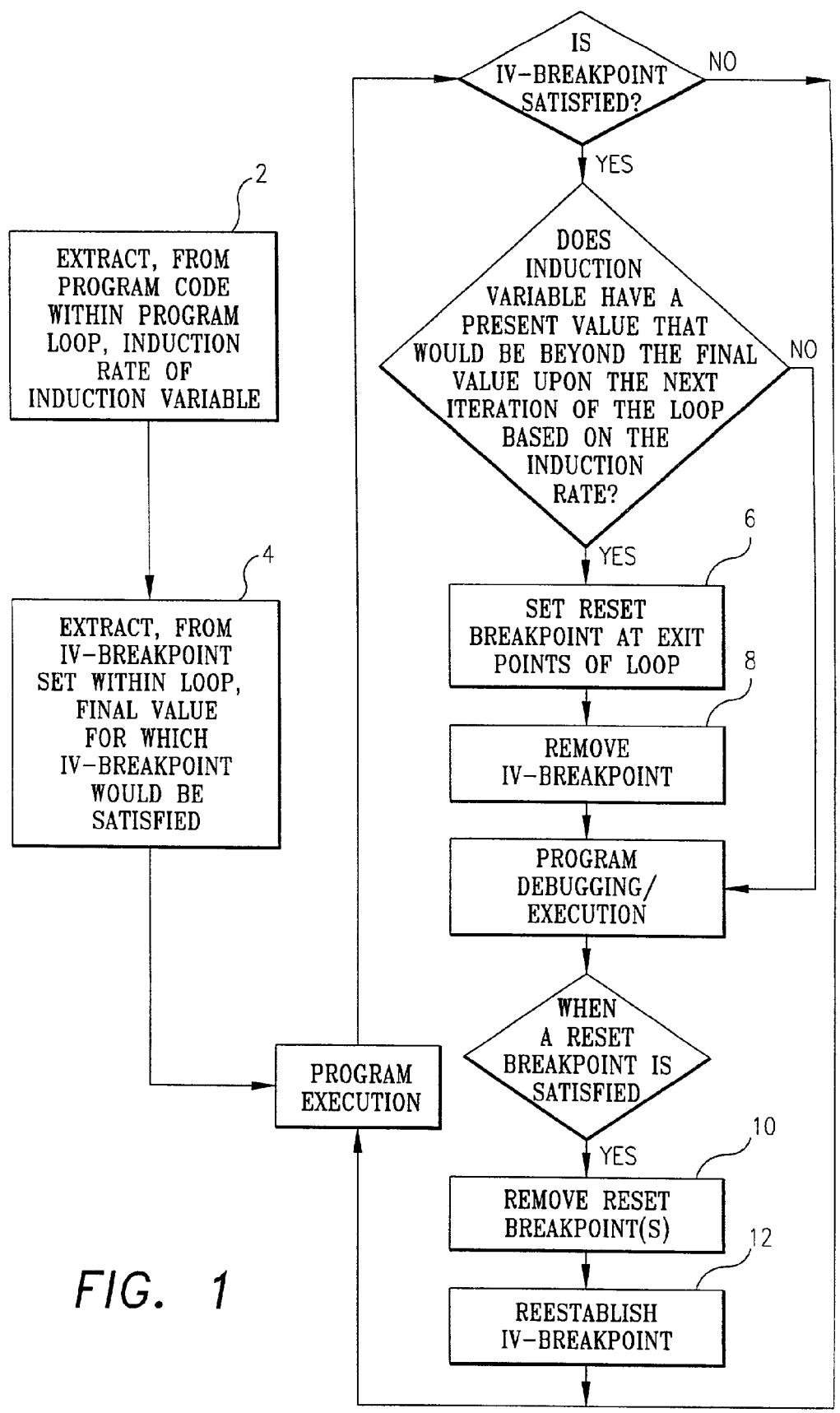
FIG. 1 is a flow diagram illustrating debugger impact reduction through motion of an IV-breakpoint, set within a program loop, with optional reset breakpoint settings, according to an embodiment of the invention.
Figure 2:
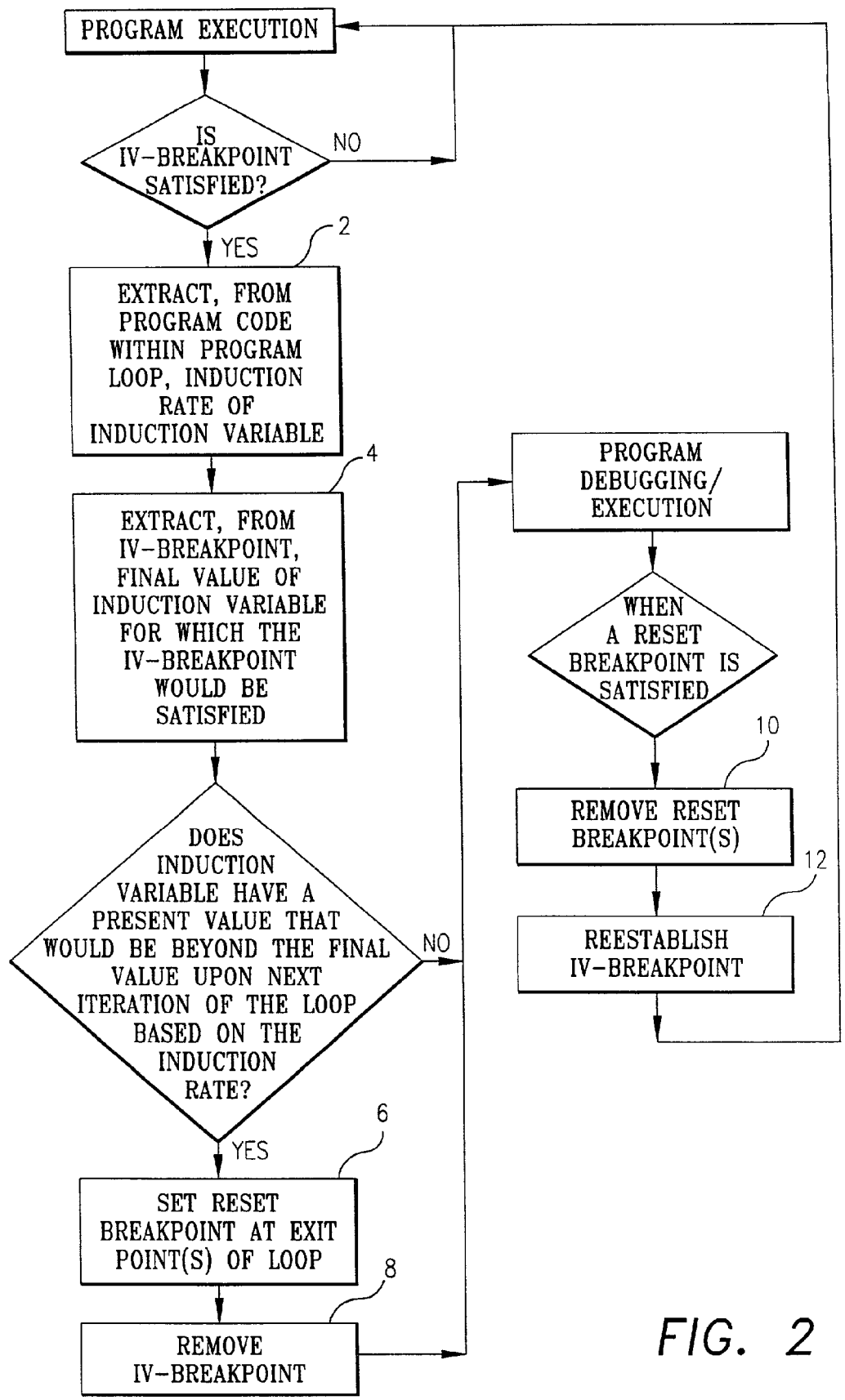
FIG. 2 is a flow diagram illustrating debugger impact reduction according to another embodiment of the invention.

As shown in FIGS. 1 and 2, in exemplary aspects of the invention, a debugger (not shown) may effectuate IV-breakpoint motion through an induction rate extraction (block 2); a final value extraction (block 4); an optional reset breakpoint setting (block 6); an IV-breakpoint removal (block 8); an optional reset breakpoint removal (block 10); and an optional IV-breakpoint reestablishment (block 12).

Reference is now made to FIGS. 3 and 4 to illustrate exemplary breakpoint motions by a debugger (not shown) according to aspects of the invention as illustrated in FIGS. 1 and 2. FIGS. 3 and 4 illustrate exemplary sets of program code containing exemplary IV-breakpoints within exemplary program loops.

As shown in FIGS. 3 and 4, an IV-breakpoint 20 may be set within a program loop, where the IV-breakpoint 20 and loop are controlled by an induction variable 22. In FIG. 3, IV-breakpoint 20 is set within a for-loop, at line 6, and induction variable 22 is the variable "J"; while in FIG. 4, IV-breakpoint 20 is set within a while-loop, at line 6, and induction variable 22 is also the variable "J".

In an induction rate extraction (block 2), a debugger may extract, from program code within the program loop, an induction rate 24 of induction variable 22. An induction rate extraction (block 2) may take place before IV-breakpoint 20 is satisfied, as illustrated in FIG. 1, or after IV-breakpoint 20 is satisfied, as illustrated in FIG. 2.

Thus, as shown in FIG. 3, a debugger may extract induction rate 24 as "J=J+1" from the increment expression "J++" on line 4 either before or after IV-breakpoint 20 is satisfied. Notably, induction rate 24 need not be a positive rate. For example, induction rate 24 may be "J=J−2" for a particular program loop.

As illustrated in FIG. 4, induction rate 24 may be variable, as long as induction rate 24 is determinable by the debugger at some point up to when IV-breakpoint 20 is satisfied. Thus, as shown in FIG. 4, a debugger may extract induction rate 24 as "J=J+1" from the increment statement "J++" on line 8 after evaluating the variable "FLAG" to be true; or as "J=J+2" from the increment statement "J+=2" on line 10 after evaluating the variable "FLAG" to be false, both either before or after IV-breakpoint is satisfied.

In a final value extraction (block 4), a debugger extracts from IV-breakpoint 20 a final value 26 of induction variable 22 for which IV-breakpoint would be satisfied, either before IV-breakpoint is satisfied, as shown in FIG. 1, or after IV-breakpoint is satisfied, as shown in FIG. 2.

As illustrated in FIG. 3, a debugger extracts final value 26, from the condition "J<500" of IV-breakpoint 20, as the value "499" since induction rate 24 has a positive rate and the value "499" is the last value of induction variable 22 for which IV-breakpoint 20 may be satisfied. As illustrated in FIG. 4, a debugger extracts final value 26, from the condition "J<500 OR J==600" of IV-breakpoint 20, as the value "600" since induction rate 24 has a positive rate and the value "600" is the last possible value of induction variable 22 for which IV-breakpoint 20 may be satisfied.

It should be noted that final value 26 may be either a technically exact last value for which a respective IV-breakpoint 20 would be satisfied, or simply the last possible value for which a respective IV-breakpoint may be satisfied. For example, in FIG. 3, were induction rate 24 "J=J+2", the technically exact last possible value of induction variable 22 would be the value "498", whereas the last possible value would be "499". However, extracting either value as final value 26 would achieve the same result, which will be evident from the discussion below.

It should be noted that a program loop may be encountered only once during execution of the program. However, a program loop may be encountered multiple times during execution of a program. Therefore, the present invention includes setting one or more optional reset breakpoints to accommodate program loops that may be encountered multiple times.

In an optional reset breakpoint setting (block 6), the debugger may set a reset breakpoint 28 (discussed in further detail below) at one or more loop exit program positions. In FIG. 3, the debugger sets a reset breakpoint 28 at line 8; while in FIG. 4, the debugger sets a reset breakpoint at lines 12 and 14.

It should be noted that a loop exit program position may be a program position that would be reached after, or as, the loop finishes iterating, but nonetheless, before the respective loop is subsequently reentered. A loop exit position may be within the loop itself, as is illustrated in FIG. 4, in which a reset breakpoint 28 is set within the loop at line 12; or outside the loop, as is illustrated in FIG. 3, in which a reset breakpoint is set outside the loop at line 8.

In an IV-breakpoint removal (block 8), two initial conditions exist. First, the IV-breakpoint is satisfied; and second, the induction variable 22 has a present value that would be beyond the final value 26 upon the next iteration of the loop based on the induction rate.

Thus, as to the second condition, referring to FIG. 3, after IV-breakpoint 20 is satisfied, the debugger may observe, in the 499$^{th}$ iteration of the loop, that induction variable 22 has a present value of "499", which due to induction rate 24 being "J=J+1", will have a value of "500" upon the next iteration of the loop, which is beyond final value 26 ("499"). Accordingly, the debugger will know that IV-breakpoint 20 would not be satisfied for the remaining iterations of the loop, and thus, would remove IV-breakpoint 20.

Again as to the second condition, referring to FIG. 4, after IV-breakpoint 20 is satisfied, the debugger may observe, in a particular iteration of the loop (which will depend on the value of the variable FLAG), that induction variable 22 has a present value that due to induction rate 24 being "J=J+1" or "J=J+2" will have a certain value (i.e., "601" or "602") upon the next iteration of the loop that would be beyond final value 26 ("600"). Accordingly, the debugger would know that IV-breakpoint 20 will not be satisfied for the remaining iterations of the loop, and thus, will remove IV-breakpoint 20.

It should be noted that some debuggers may allow a programmer to change, during a debugging session, the value of a variable, which may be induction variable 22. Under such circumstances, if IV-breakpoint 20 had been removed, and may be thereafter satisfied due to the new value given to induction variable 22, optional IV-breakpoint reestablishment (block 12) (discussed further below) may be effectuated to accommodate this situation.

After removing IV-breakpoint 20, the debugger creates a state that assists in avoiding unnecessary evaluations of IV-breakpoint 20 that may have occurred within the program loop. From this state, a programmer may debug the program as initially desired, and when ready, allow the program to further execute. When program execution reaches a reset breakpoint 28, an optional reset breakpoint removal (block 10) may be effectuated, as the reset breakpoint 28 would no longer be needed. Also, when program execution reaches a reset breakpoint 28, an optional IV-breakpoint reestablishment (block 12) may be effectuated to allow IV-breakpoint 20 to be subsequently satisfied when the program loop is reentered.

It should be understood, however, that the invention is not necessarily limited to the specific process, order, arrangement and components shown and described above, and may be susceptible to numerous variations within the scope of the invention. For example, although the above-described exemplary aspects of the invention are believed to be particularly well suited for reducing debugger impact with for-loops and while-loops, it is contemplated that the concepts of the present invention can be adapted for various types of programming loop and programming language syntaxes. For example, the concepts of the present application can be utilized with a do-while-loop, a goto-loop, etc., in Assembly, Basic, C, C++, etc.

Further, the debugger of the present invention may encompass other software means insofar as the other software means perform an aspect of the present invention. For example, to the extent a compiler performs an induction rate extraction (block 2), the debugger of the present invention is intended to encompass that portion of the compiler.

It will be apparent to one skilled in the art that the manner of making and using the claimed invention has been adequately disclosed in the above-written description of the embodiments taken together with the drawings. Further, it will be apparent that the above methods may be readily embodied in a method, a software debugger, and a computer program medium, which may be any form of a computer program medium readable by a computer, such as, for example, a CD-ROM, RAM, a hard drive, a cache, etc.

It will be understood that the above description of the embodiments of the present invention are susceptible to various modifications, changes, and adaptations, and the same are intended to be comprehended within the meaning and range of equivalents of the appended claims.

What is claimed is:

1. A method of reducing debugger impact through motion of an IV-breakpoint set within a program loop, where the IV-breakpoint and the loop are controlled by an induction variable having an induction rate that is determinable at least when the IV-breakpoint is satisfied, said method comprising:
    extracting, from program code within the loop, the induction rate;
    extracting, from the IV-breakpoint, a final value for which the IV-breakpoint may be satisfied; and
    if the IV-breakpoint is satisfied and the induction variable has a present value that would be beyond the final value upon a next iteration of the loop based on the induction rate, removing the IV-breakpoint.

2. The method of claim 1, further comprising:
    if the IV-breakpoint is satisfied and the present value of the induction variable would be beyond the final value upon the next iteration of the loop based on the induction rate, setting, at a first loop exit program position, a first reset breakpoint; and
    if said first reset breakpoint is satisfied, reestablishing the IV-breakpoint.

3. The method of claim 2, further comprising:
    if said first reset breakpoint is satisfied, removing said first reset breakpoint.

4. The method of claim 1, further comprising:
    if the IV-breakpoint is satisfied and the present value of the induction variable would be beyond the final value upon the next iteration of the loop based on the induction rate, setting, at a second loop exit program position, a second reset breakpoint; and
    if one of said first and second reset breakpoints is satisfied, reestablishing the IV-breakpoint.

5. The method of claim 4, further comprising:
    if one of said first and second reset breakpoints is satisfied, removing said first and second reset breakpoints.

6. An article of manufacture comprising:
    a computer program medium readable by a computer and embodying one or more instructions executable by the computer to perform a method of reducing debugger impact through motion of an IV-breakpoint set within a program loop, where the IV-breakpoint and the loop are controlled by an induction variable having an induction rate that is determinable at least when the IV-breakpoint is satisfied, wherein the method of reducing debugger impact includes the steps of
    extracting, from program code within the loop, the induction rate; extracting, from the IV-breakpoint, a final value for which the IV-breakpoint may be satisfied; and
    if the IV-breakpoint is satisfied and the induction variable has a present value that would be beyond the final value upon a next iteration of the loop based on the induction rate, removing the IV-breakpoint.

7. The article of manufacture of claim 6, wherein the method further comprises:
    if the IV-breakpoint is satisfied and the present value of the induction variable would be beyond the final value upon the next iteration of the loop based on the induction rate, setting, at a first loop exit program position, a first reset breakpoint; and
    if said first reset breakpoint is satisfied, reestablishing the IV-breakpoint.

8. The article of manufacture of claim 7, wherein the method further comprises:
    if said first reset breakpoint is satisfied, removing said first reset breakpoint.

9. The article of manufacture of claim 7, wherein the method further comprises:
    if the IV-breakpoint is satisfied and the present value of the induction variable would be beyond the final value upon the next iteration of the loop based on the induction rate, setting, at a second loop exit program position, a second reset breakpoint; and
    if one of said first and second reset breakpoints is satisfied, reestablishing the IV-breakpoint.

10. The article of manufacture of claim 9, wherein the method further comprises:
    if one of said first and second reset breakpoints is satisfied, removing said first and second reset breakpoints.

* * * * *